United States Patent [19] [11] 4,118,118
Barto, Jr. [45] Oct. 3, 1978

[54] ELECTROSTATIC COPIER MACHINE WITH SELECTABLE MAGNIFICATION RATIOS

[75] Inventor: Robert M. Barto, Jr., Wyckoff, N.J.
[73] Assignee: Universal Photocopy, Inc., Mountainside, N.J.

[21] Appl. No.: 684,407
[22] Filed: May 7, 1976
[51] Int. Cl.[2] ...................... G03G 15/28; G03B 27/52; G03B 27/34
[52] U.S. Cl. ........................................ 355/8; 355/11; 355/55; 355/57
[58] Field of Search .................. 355/8, 11, 55, 56, 57, 355/60

[56] References Cited

U.S. PATENT DOCUMENTS

| | | | |
|---|---|---|---|
| 3,476,478 | 11/1969 | Rees | 355/55 |
| 3,542,467 | 11/1970 | Ferguson et al. | 355/60 X |
| 3,614,222 | 10/1971 | Post et al. | 355/8 |
| 3,778,147 | 12/1973 | Reehil et al. | 355/57 X |
| 3,829,209 | 8/1974 | Buddendeck et al. | 355/57 X |
| 3,832,057 | 8/1974 | Shogren | 355/8 |

*Primary Examiner*—Fred L. Braun
*Attorney, Agent, or Firm*—Michael Ebert

[57] ABSTRACT

A xerographic copier machine capable of producing copies of an original document in a selectable magnification ratio. The machine includes an object mirror and a light source forming a scanning assembly which travels at a uniform velocity under a transparent platen on which the document to be copied is placed, face down. The object mirror reflects the illuminated image of the document toward a relay mirror moving in the same direction but at half the scan velocity, the relay mirror directing the image toward a stationary projection lens, behind which is a reflex mirror. The reflex mirror redirects the image through the lens onto an image mirror which casts the image onto the photoreceptor surface of a rotating drum. The peripheral velocity of the drum is synchronized with the scan velocity of the scan assembly by an adjustable transmission whereby a latent image of the entire document is formed in the photoreceptor surface. In order to selectively change the magnification ratio, a retractable auxiliary lens is placed in front of the projection lens to alter the focal length of the optics, and the position of the image mirror relative to the drum is shifted to bring the image in focus on the photoreceptor surface. The synchronization transmission is adjusted to change the scan velocity of the assembly to a value appropriate to the selected magnification ratio.

9 Claims, 5 Drawing Figures

ELECTROSTATIC COPIER MACHINE WITH SELECTABLE MAGNIFICATION RATIOS

BACKGROUND OF INVENTION

This invention relates generally to xerographic copying machines, and more particularly to a copier capable of producing copies in a selected magnification ratio with respect to the original document from which the copies are produced.

In the xerographic technique, a photoconductive insulating layer whose surface is uniformly charged electrically is first exposed to an illuminated pattern of light and shadow of the intelligence to be recorded. The blanket charge on the layer is selectively dissipated by the illuminated pattern to yield a latent electrostatic image. Thereafter, to develop the image, finely-divided pigmented thermoplastic powder or toner is deposited on the latent image, the toner particles adhering to the electrostatically-charged areas in proportion to the charges thereon.

In a plain paper xerographic printer, the photoconductive insulating layer is supported on a rotating drum or on a continuous belt and the toner image developed on the surface of this layer is transferred therefrom onto a sheet of ordinary paper. The developed image on the paper is then fixed thereto by heat or pressure which fuses the toner particles to the paper.

In a treated-paper xerographic printer, there is no need to transfer the developed toner image from the photoconductive insulating layer, for in this instance use is made of paper coated with photoconductive zinc oxide particles dispersed in a film-forming resin binder. The coated surface of the paper is subjected to a blanket electrostatic charge which is then exposed to the light pattern to be recorded to create a latent image thereon. This latent image is developed by toner which is directly fixed onto the treated paper, thereby obviating the transfer step characteristic of an untreated paper printer.

The present invention is concerned primarily with apparatus adapted selectively to change the magnification ratio of the copy with respect to the original document, the invention being fully applicable both to treated and plain paper xerographic copier machines.

Electrostatic copiers are known which are capable of producing copies that may be either full-scale copies of the original document or enlarged or reduced in size with respect to the original document. Thus in the Lux U.S. Pat. No. 3,556,655, there is disclosed for this purpose a turret lens assembly movable between different positions for projecting a full-size or a reduced-size image of an original onto a a copy sheet.

To avoid the need for employing different magnifying lens for selectively changing the magnification ratio, the Reehil et al. U.S. Pat. No. 3,778,147 provides a single lens which is made linearly movable with respect to the original document and an image plane. In a similar fashion, in the Knechtel U.S. Pat. No. 3,703,334, a change in magnification is effected by shifting the position of an objective lens and of the mirror associated therewith. Reproductions of different scale are likewise effected in the Muller U.S. Pat. No. 3,687,544 by shifting the position of an objective and its associated mirror.

Thus in order to change the magnification ratio in an electrostatic copier machine, it was heretofore the practice to change the distance between the original document and the objective lens as well as the position of mirrors associated with the lens. These requirements introduce mechanical problems which add substantially to the cost and complexity of the machine. Moreover, the space heretofore needed to incorporate a selectable magnification ratio system into a standard copier is such as to expand the machine dimensions, further adding to the cost of manufacture and precluding a compact structure.

SUMMARY OF INVENTION

In view of the foregoing, the main object of this invention is to provide an improved copier machine capable of producing copies in a selectable magnification ratio with respect to the original document from which the copies are produced.

More particularly, it is an object of the invention to provide an optical system for producing copies in different magnification ratios, which system makes use of a stationary projection lens and is of relatively simple, low-cost design.

A significant advantage of an optical arrangement in accordance with the invention is that it lends itself to incorporation in existing electrostatic copiers of compact design without expanding the size of the machine. Another advantage of the invention is that the optical requirements for selective magnification ratios are minimized by means of a reflex system in which the stationary projection lens and the auxiliary lens associated therewith to change the focal length appear twice in the optical path, giving rise to a relatively long focal length.

It is also an object of the invention to provide an optical arrangement in which the optical distance between the document to be copied and the projection lens remains constant regardless of the magnification ratio selected, a change in magnification being effected by shifting the position of only a single mirror.

Briefly stated, these objects are attained in a xerographic copying machine which includes a scanning assembly constituted by an object mirror and a light source which travelsbelow a transparent platen on which the document to be copied is placed face down. The assembly moves in a horizontal path at a uniform scan velocity from an initial position to a final position and then reverts to its initial position.

The scanning object mirror, as it traverses the document, reflects the illuminated image thereof toward a relay mirror traveling in the same direction but at a velocity which is one half the scan velocity of the assembly. The relay mirror directs the image toward a stationary projection lens behind which is a fixed reflex mirror that re-directs the image through the lens onto an image mirror which is oriented to cast the image on the photoreceptor surface of a rotating drum. The scan velocity of the assembly is synchronized with the peripheral velocity of the drum by an adjustable transmission whereby a latent image of the entire document is formed on the photoreceptor surface.

In order to selectively change the magnification ratio without altering the overall optical distance between the document and the projection lens, a retractable auxiliary lens producing the desired magnification ratio is placed in front of the projection lens to change the focal length of the optical system. The position of the image mirror relative to the drum is shifted to an extent determined by the changed focal length to bring the image in focus on the photoreceptor surface. The synchronization transmission is adjusted to change the scan velocity to a value appropriate to the selectedmagnification ratio.

OUTLINE OF DRAWING

For a better understanding of the invention as well as other objects and further features thereof, reference is made to the following detailed description to be read in conjunction with the accompanying drawings, wherein.

DESCRIPTION OF INVENTION

The Prior Art Arrangement

Figure 1:
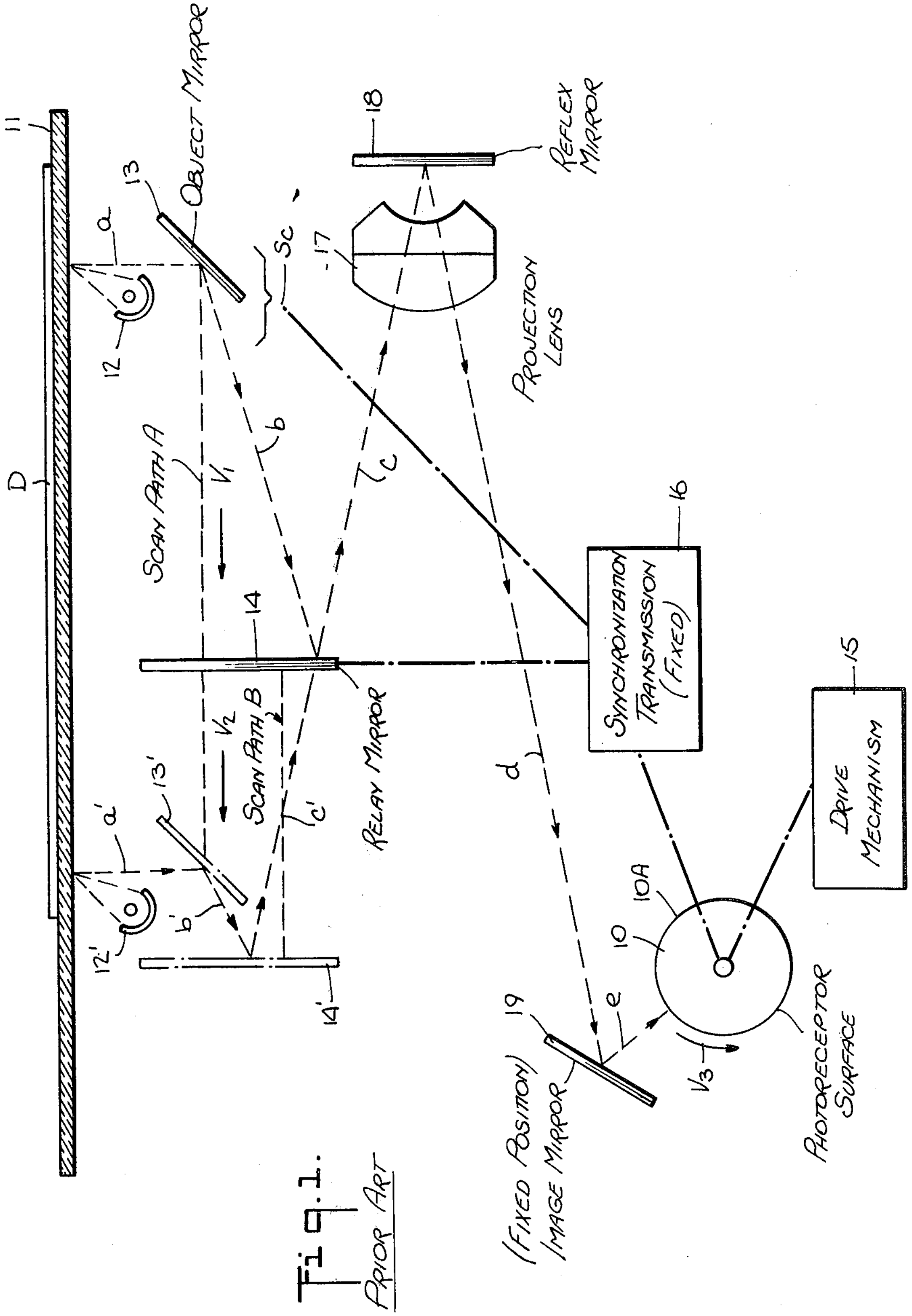
Fig. 1. PRIOR ART
FIG. 1 is a schematic diagram of a prior art type of xerographic copier machine having a fixed magnification ratio.

We shall now describe a typical prior art arrangement in which the size of the original document relative to that of the copy has a fixed magnification ratio. The term "magnification ratio" as used herein includes a copy that is of reduced or enlarged scale with respect to an original document from which the copy is produced. Therefore, a numerical representation of the magnification ratio may be less than, equal to or greater than unity.

As in all xerographic machines, an illuminated image of an original document D to be reproduced is projected onto the sensitized surface of a photoreceptor which is supported on the surface of a rotating drum 10 to form an electrostatic latent image thereon. In practice, in lieu of a drum, a continuous belt may be used. Thereafter, the latent image is developed with an oppositely-charged toner to create a xerographic powder image corresponding to the latent image on the photoreceptor surface.

The powder image is then electrostatically transferred from the drum onto a support surface or paper sheet and fixed thereto by a fusing device to cause the powder image to adhere permanently to the sheet. Since the present invention is concerned with the optics of a selectable magnification ratio system, the well-known mechanisms of a standard xerographic copier will not be detailed except to the extent necessary to an understanding of the present invention.

Document D to be copied is laid face down on a transparent support platen 11 where it is scanned by a scanning assembly Sc constituted by a light source 12 physically coupled to an object mirror 13 and movable therewith. Scanning assembly Sc is adapted to traverse document D by traveling across the underside of platen 11 with a uniform motion at a velocity $V_1$, thereby illuminating the document. The scan is along a horizontal scan path A extending from an initial position of object mirror 13, as shown in solid lines in FIG. 1, to a final position, as shown by mirror 13' in dashed lines, the assembly then returning to the initial position.

A relay mirror 14 is arranged to move in the same horizontal direction as the scanning assembly *Sc* along a path B but with a velocity $V_2$ which is one half the value of scan velocity $V_1$. That is to say, when object mirror 13 is displaced by an increment $\Delta$ X, relay mirror 14 will be displaced $\Delta$ X/2. Relay mirror 14 moves from its initial position, as shown in full lines in FIG. 1, to its final position 14', represented by dashed lines. The length of path B is therefore one half that of scan path A.

Drum 10 is driven by a suitable drive mechanism 15, the scanning assembly *Sc* and the moving relay mirror 14 being driven in synchronism with rotating drum 10 through a transmission represented by block 16.

The illuminated image of original document D is directed by object mirror 13 toward relay mirror 14 which reflects the image toward a projection lens 17 whose position is stationary. Placed behind projection lens 17 is a reflex mirror 18. The image is directed by reflex mirror 18 through projection lens 17 toward an image mirror 19 which is at a fixed position and is oriented to cast the projected image onto the photoreceptor surface 10A of rotating drum 10. While reflex mirror 18 is shown as a separate element, in practice a typical reflex lens-mirror assembly is constructed in a manner in which the elements are combined into a one-piece unit.

Drum 10 is rotated by drive mechanism 15 with a peripheral velocity $V_3$ that is exactly synchronized with scan velocity $V_1$ of the scan assembly *Sc* by transmission 16. Thus as drum 10 rotates with a peripheral velocity $V_3$, scanning assembly *Sc* moves along horizontal path A with a velocity $V_1$, and relay mirror 14 moves concurrently along path B with a velocity $V_2$ which is one half that of velocity $V_1$. The relationship between the values of velocities $V_3$ and $V_1$ depends on the fixed magnification ratio for which the copier machine is designed.

The reason why the conventional optical arrangement shown in FIG. 1 provides a fixed magnification ratio will now be explained.

The optical distance OD in the folded path extending between the original document D and reflex mirror 18 is made up of the following segments:

Segment *a,* which is the segment between document D and object mirror 13.

Segment *b,* which is the segment between object mirror 13 and relay mirror 14.

Segment *c,* which is the segment between relay mirror 14 and reflex mirror 18.

In FIG. 1, segments *a'*, *b'* and *c'* represent the corresponding folded optical path when the scanning assembly is at its final position in scan path A. Thus the object distance OD $= a + b + c$. Though the length of segment *a* never changes regardless of the position of the scanning assembly *Sc* along scan path A, as the scanning assembly travels from its initial position to its final position, segment *b* grows shorter while segment *c* concurrently grows correspondingly shorter because of the relative velocities $V_1$ and $V_2$ of object mirror 13 and relay mirror 14, respectively. Hence the object distance OD is constant.

The image distance ID in the folded path extending between reflex mirror 18 and the surface of drum 10 is made up of the following optical path segments:

Segment *d,* which is the distance between reflex mirror 18 and image mirror 19.

Segment *e,* which is the distance between image mirror 19 and the surface of drum 10.

Hence image distance ID $= d + e$. Since segments *d* and *e* never change, image distance ID is constant. And since object distance OD is constant and image distance ID is constant, the overall distance between document D and the surface of drum 10, which is equal to OD + ID, remains unchanged despite the scanning action.

The Selectable Magnification Ratio System

Figure 2:
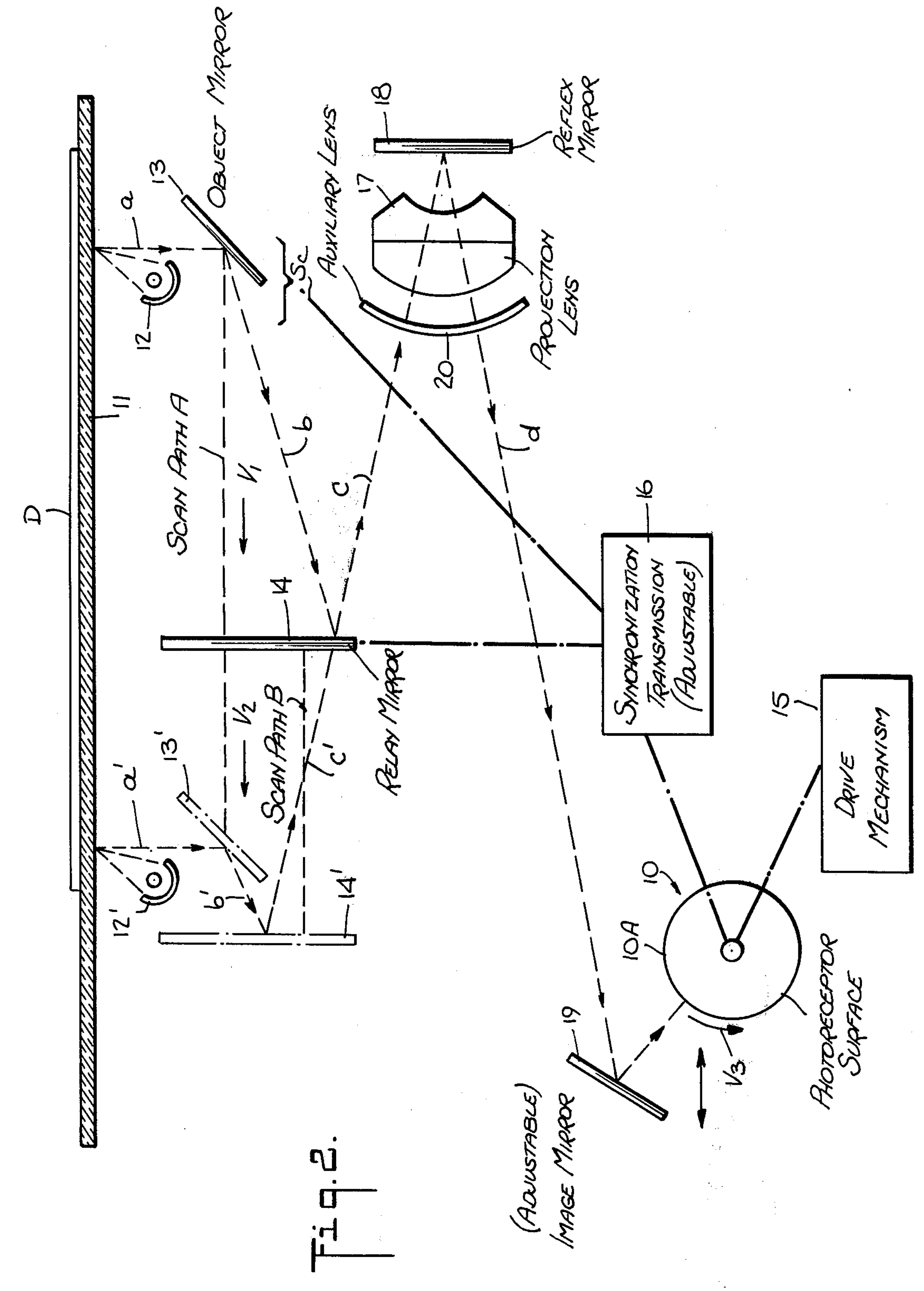
FIG. 2 is a schematic diagram of a copier machine which includes a selectable magnification ratio optical system in accordance with the invention.

Referring now to FIG. 2, there is shown an arrangement in accordance with the invention, the selectable magnification ratio system being essentially the same as the fixed magnification system shown in FIG. 1, except for the fact that associated with projection lens 17 is a retractable lens 20, and that the position of image mirror 19, instead of being fixed, is shiftable relative to drum 10. Also, synchronizing transmission 16, instead of providing a fixed relationship between the peripheral velocity $V_3$ of drum 10 and the scan velocity $V_1$ of scan assembly *Sc* is adjustable to afford a relationship appropriate to the selected magnification ratio.

When auxiliary lens 20 is placed in front of projection lens 17, it is then interposed in path segments *c* and *d* to change the focal length of the optical system. Assuming that auxiliary lens 20 is positive, the focal length F will be shortened.

The optical arrangement may therefore be expressed by the equation:

$$I/F = (I/OD) + (I/ID),$$

where F is the focal length, OD is the object distance, and ID the image distance. Since, as previously explained, the value of OD is constant despite the scanning action, in order for the system to be in focus, the value of ID, the image distance must be adjusted.

This is accomplished by moving image mirror 19 to a new position, as shown in FIG. 2, to the extent necessary to exactly focus the system. But since now the apparent object velocity with respect to the scanning assembly and the image velocity at the photoreceptor surface of drum 10 will now be in a ratio of OD/ID, a change must be made in the relative velocities $V_1$ and $V_3$. This is effected by adjusting transmission 16 to an extent dictated by the selected magnification ratio.

When the magnification is such as to produce a reduced scale image, say, 1 to $\frac{3}{4}$, the scanning velocity $V_1$ is increased by the reciprocal of the reduction; i.e., by 4/3. And when, therefore, the reduction in scale is 1 to $\frac{2}{3}$, the scanning velocity $V_1$ is increased by 3/2.

Operation of System

Figure 3:
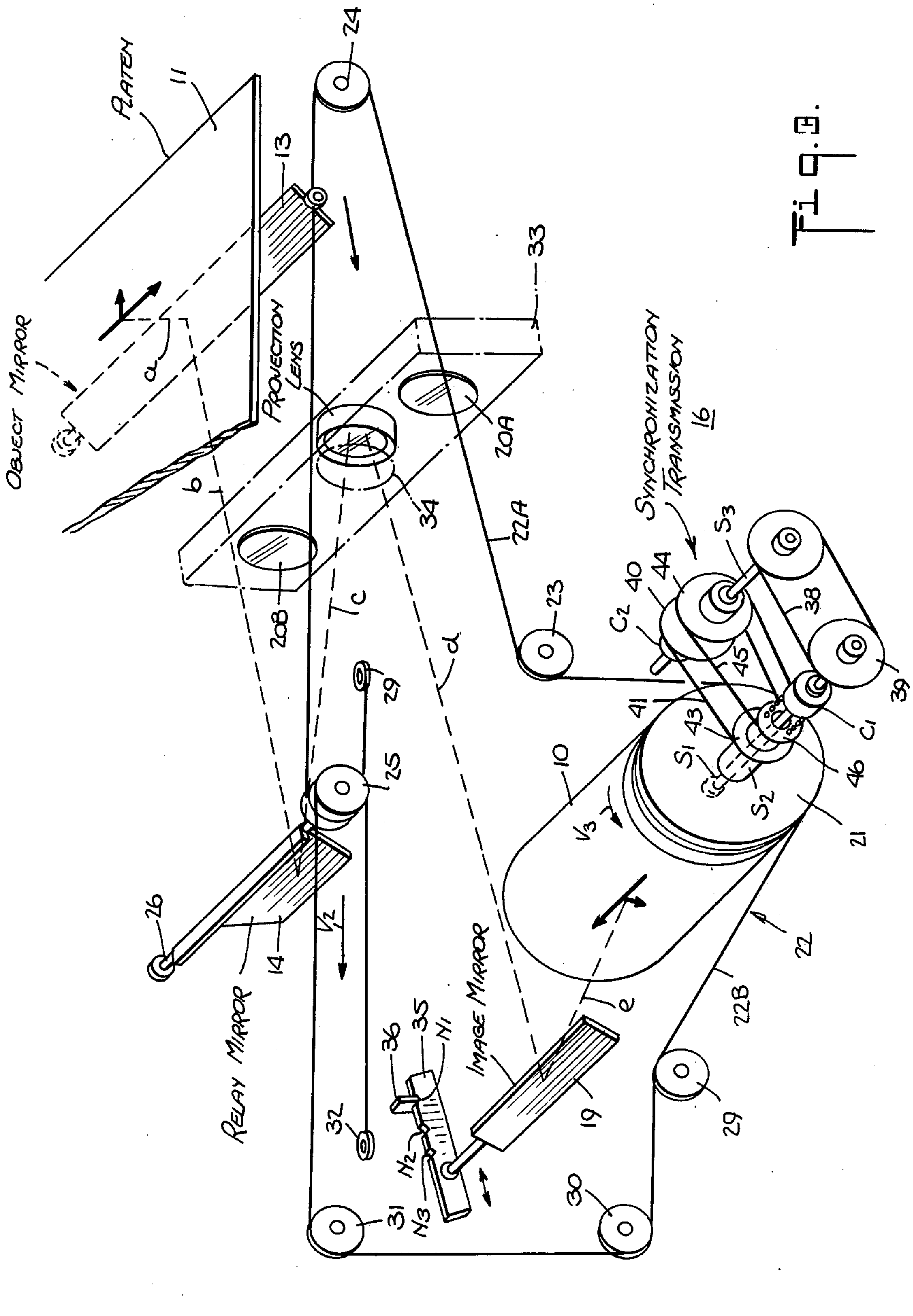
FIG. 3 is a perspective view of the optical system in accordance with the invention in its full scale copy mode.
Figure 4:
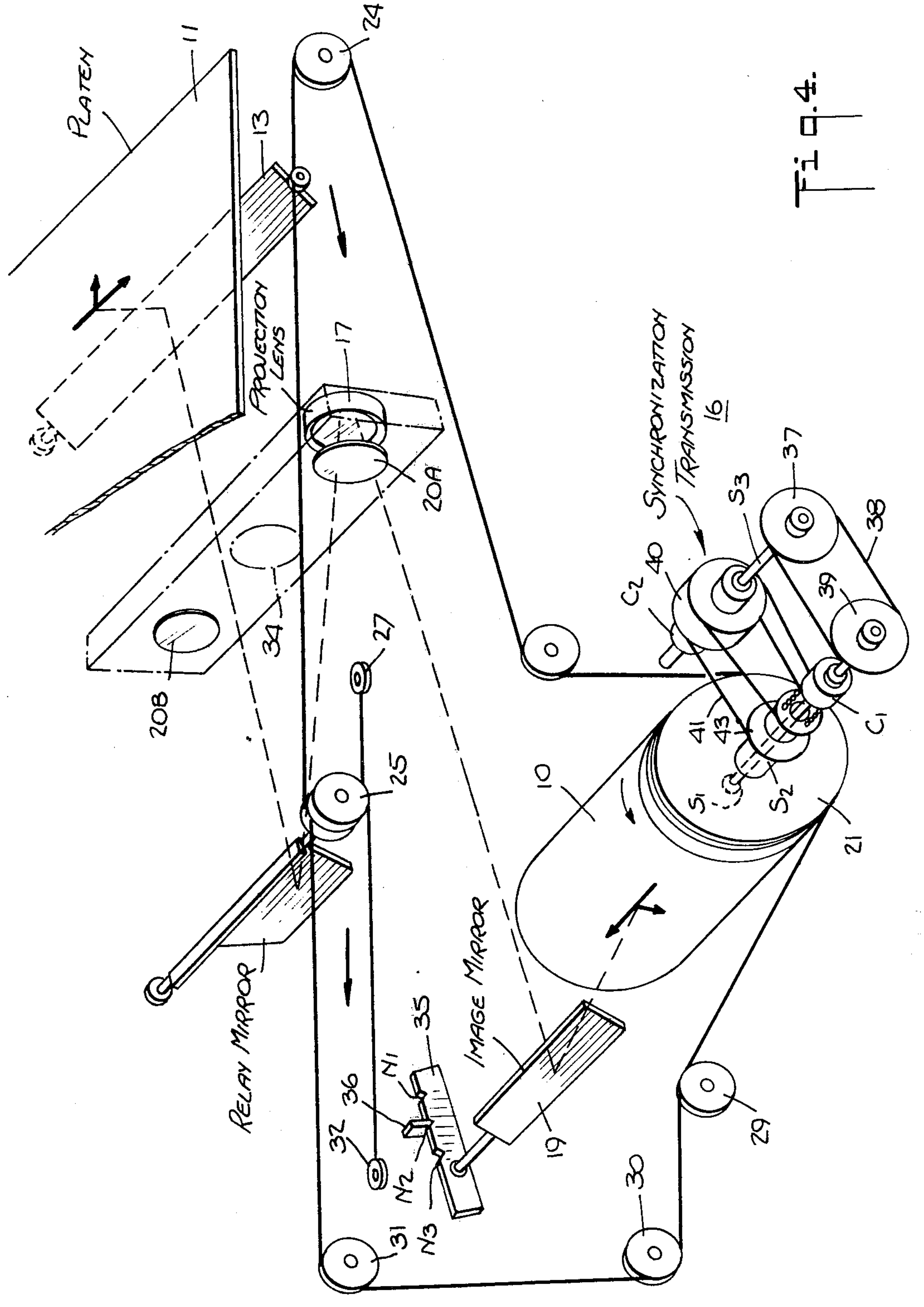
FIG. 4 shows the same system in a first reduction mode.
Figure 5:
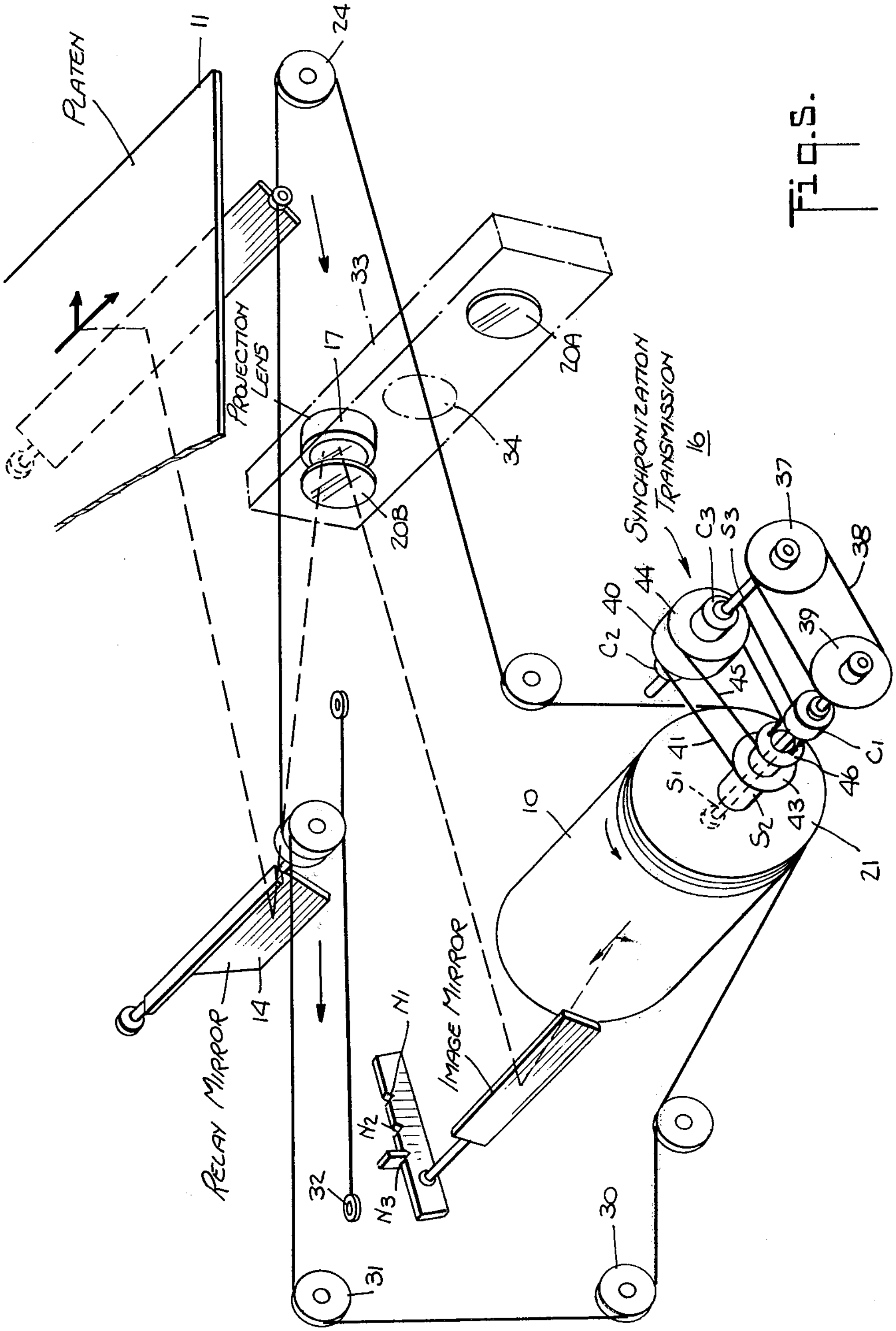
FIG. 5 shows the same system in a second reduction mode.

Referring now to FIGS. 3, 4 and 5, the operation of the selectable magnification ratio system will now be explained first as the system behaves in the full-scale mode (FIG. 3) in which the size of the copy is the same as the size of the original document, then in a first-reduction mode (FIG. 4) in which the size of the copy is reduced with respect to that of the document, and finally in a second-reduction mode (FIG. 5) in which a further reduction in scale is effected.

Referring first to FIG. 3, it will be seen that object mirror 13 is arranged to scan a document (not shown) which is placed face-down on platen 11. The image reflected by object mirror 13 is directed toward relay mirror 14. The scanning velocity of object mirror 13 is $V_1$ while the velocity $V_2$ of movement of relay mirror 14 is one half of $V_1$.

Movement of mirrors 13 and 14 at the appropriate velocities is effected through an adjustable synchronization transmission, generally designated by numeral 16. The transmission is operatively coupled to drum 10 which is supported on a motor-driven shaft $S_1$ (the drive motor is not shown). Drum 10 is driven to rotate at a peripheral velocity $V_3$ which, in the case of full-scale model operation illustrated in FIG. 3, is equal to the scan velocity $V_1$ of the image mirror 13.

The manner in which adjustable transmission 16 acts to drive object mirror 13 and relay mirror 14 so that object mirror 13 scans at a velocity $V_1$ which is equal to the drum peripheral velocity $V_3$, and whereby relay mirror 14 travels at a velocity $V_2$ which is one-half of $V_2$, will now be explained.

Positioned adjacent one end of drum 10 and concentric therewith is a main cable wheel 21 having the same diameter as the drum. Wheel 21 is supported on a hollow shaft $S_2$ surrounding drum shaft $S_1$ and coaxial therewith. Coaxial shaft $S_2$ is directly linked to drum shaft $S_1$ only when an electromagnetic clutch $C_1$ is engaged, and since the drum and main cable wheel have the same diameter, then in that condition they both rotate with the same peripheral velocity $V_3$.

Cable wheel 21 drives a cable 22 whose right end section 22A runs over idler wheels 23 and 24 and then encircles one section of a double pulley 25. Pulley 25 is mounted at the end of a rod 26 from which relay mirror 14 is supported, the right end section 22A of the cable encircling the pulley terminating in an anchor 27. Right end cable section 22A is linked by a connector 28 to object mirror 13, so that as the cable moves in either direction, the object mirror is carried thereby.

The left end section 22B of cable 22 runs over idler wheels 29, 30 and 31 and then encircles the second section of double pulley 25 attached to relay mirror 14, this cable section terminating in an anchor 32. Hence when in the full-scale mode, main cable wheel 21 is caused to run at the same peripheral velocity $V_3$ as the drum, object mirror 13 is made to scan at a velocity $V_1$ which is equal to $V_3$, whereas relay mirror 14, because of the double-pulley drive action, is made to run at velocity $V_2$ which is half that of $V_1$.

It will be seen in FIG. 3 that projection lens 17 is associated with a pair of auxiliary lenses 20A and 20B, lens 20A being designed to provide a reduction in copy size for the first-reduction mode and lens 20B to provide a reduction in the copy size for the second-reduction mode. Lenses 20A and 20B are supported adjacent the opposite ends of a selector plate 33 having a central aperture 34. As shown in FIG. 3, this aperture is aligned with projection lens 17 so that in the full-scale mode the projection lens is uncovered. The selector plate arrangement is such that in the first-reduction mode it is stepped in one direction to cover projection lens 17 with auxiliary lens 20A, and in the second reduction mode it is stepped in the reverse direction to cover lens 17 with auxiliary lens 20B.

Image mirror 19 is supported by a rod extending from a shiftable latching plate 35 whose three notches $N_1$, $N_2$ and $N_3$ are engageable by a detent 36, such that when notch $N_1$ is engaged, image mirror 19 then occupies a position relative to drum 10 which provides a focal length appropriate to the full-scale mode, as shown in FIG. 3. Detent notch $N_2$ provides an image mirror position appropriate to the first-reduction mode, notch $N_3$ being reserved for the second-reduction mode.

It is essential that the image cast by image mirror 19 onto the photoreceptor surface of drum 10 be directed in an optical path which is normal to this surface. It becomes necessary, therefore, at each of the three detent positions $N_1$, $N_2$ and $N_3$ that the image mirror at these different positions be tilted to provide the required optical path. In practice, this is accomplished by adding a cam follower and lever (not shown) to the support plate for the mirror. The follower operates in conjunction with a cam anchored to the frame of the machine, such that when the image mirror is shifted to each of its detent points, it is also then properly aimed to project the image on a radial path with respect to drum 10 so that the recorded image is free of distortion.

Referring now to FIG. 4, there is shown the arrangement for the first-reduction mode; it will be seen that now projection lens 17 is covered by auxiliary lens 20A and that the latching plate is engaged by the detent in notch $N_2$ to so position the image mirror 19 as to provide the appropriate focal length for the optical system.

In this mode, it is necessary to change the scan velocity $V_1$ of object mirror 13 so that it is faster than peripheral velocity $V_3$ of the drum to an extent determined by the reduction ratio. This is accomplished in adjustable transmission 16 by means of an auxiliary shaft $S_3$ which is supported at a position parallel to drum shaft $S_1$ and is provided at one end with a sprocket wheel 37. Wheel 37 is linked by a sprocket chain 38 to a sprocket wheel 39 secured to the corresponding end of drum shaft $S_1$, the two wheels being of the same diameter, so that auxiliary shaft $S_3$ always turns at the same speed as drum shaft $S_1$.

In the first-reduction mode illustrated in FIG. 4, clutch $C_1$ is disengaged to decouple coaxial shaft $S_2$ from drum shaft $S_1$ and a second electromagnetic clutch $C_2$ is engaged. Clutch $C_2$, when engaged, puts into operation sprocket wheel 40 supported on auxiliary shaft $S_3$. Sprocket wheel 40 is linked by a sprocket chain 41 to a smaller sprocket wheel 43 mounted on coaxial shaft $S_2$, so that in this mode, rotation of drum shaft $S_1$ brings about concurrent rotation of auxiliary shaft $S_3$ which, through sprocket wheels 40 and 43, causes the coaxial shaft $S_2$ and main cable wheel 21 to rotate.

However, in this instance, cable wheel 21 does not turn at the same speed as drum 10 but with a peripheral velocity which depends on the gear ratio between sprocket wheels 40 and 43. Since wheel 40 is larger than wheel 43, the cable wheel 21 turns at a faster speed than drum 10 and causes the scanning velocity $V_1$ to exceed the peripheral drum velocity $V_3$ to a degree appropriate to the optical reduction ratio.

Referring now to FIG. 5, for the second-reduction mode the system is then arranged with auxiliary lens 20B in front of projection lens 17, the focal length being set to focus the projected image on the drum by positioning image mirror 19 at the notch $N_3$ latching position.

It is now necessary to bring about a further increase in the velocity $V_1$ of the scanning assembly relative to the velocity $V_3$ of the drum. For this purpose, clutch $C_1$ and $C_2$ are both disengaged, and a third clutch $C_3$ is engaged which functions to operatively couple a sprocket wheel 44 to auxiliary shaft $S_3$.

Wheel 44 is linked by a sprocket chain 45 to a sprocket wheel 46 mounted on coaxial shaft $S_2$ so that now the peripheral speed of cable wheel 21 is determined by the gear ratio of sprocket wheels 44 and 46. Thus in the second-reduction mode, drum shaft $S_1$ is coupled via sprocket wheels 39 and 37 to auxiliary shaft $S_3$, and auxiliary shaft $S_3$ is coupled by sprocket wheels 44 and 46 to coaxial shaft $S_2$ to turn cable wheel 21 at a rate which is appropriate to bring about a scan assembly velocity that is faster than the peripheral velocity of the drum to a degree determined by the optical reduction ratio.

It is noted that in the system disclosed herein, the peripheral velocity of the drum remains constant, whereas the scanning velocity which is synchronized with the peripheral velocity is changed for different magnification ratios. The reason for this is that most copiers have ancillary devices such as paper transports, etc., synchronized with the peripheral speed of the drum, and it is desirable, therefore, to maintain this peripheral speed. However, in some instances, the relationship of peripheral to scanning velocity may be reversed.

In practice, when making reductions in large ratios such as 1 to 0.75 or 1 to 0.60, projected onto the photoreceptor surface 10A of the drum is extraneous material such as the object glass support frame. In order to exclude such extraneous material from the final copy, one may arrange an array of "burn-off" lamps with respect to the drum such that all areas of the photoreceptor surface beyond the boundaries of the desired image are exposed to light during the prime exposure cycle, thereby washing out such extraneous material.

To correlate these lamps with the switches which select the magnification ratio, the burn-off lamps may be activated by the same switches, so that when a given magnification ratio is selected, only those lamps are activated which provide a burn-off configuration appropriate to the selected image size.

The optical requirements of the auxiliary lens are minimized in a reflex system in accordance with the invention, for these lenses appear twice in the optical path, making possible a comparatively long focal length. By the use of a meniscus auxiliary lens of at least 3 diopters base curve, one may significantly diminish reflection fogging (scattered and non-focused light within the system).

While there have been shown and described preferred embodiments of an electrostatic copier machine with selectable magnification ratio in accordance with the invention, it will be appreciated that many changes and modifications may be made therein without, however, departing from the essential spirit thereof.

I claim:

1. A xerographic copying machine capable of producing copies of an original document in a selectable mangification ratio without shifting the position of the projection lens, the machine comprising:

(A) a scanning assembly constituted by an object mirror and a light source adapted to travel at a uniform velocity with respect to the document to be copied, said document being laid face down on a transparent platen under which said scanning assembly travels;

(B) a relay mirror operatively coupled to the scanning assembly and movable in the same direction but at one-half the velocity thereof, an illuminated image of the document being directed by the object mirror onto the relay mirror;

(C) a stationary projection lens behind which is a reflex mirror at a fixed position, the relay mirror being oriented to direct the image through said lens onto the reflex mirror;

(D) a rotating drum having a photoreceptor surface, said drum rotating at a given peripheral speed;

(E) an image mirror associated with the drum and the reflex mirror, whereby the image on said reflex mirror is directed through said projection lens onto said image mirror and the image is cast thereby on the photoreceptor surface, and means to shift the position of said image mirror to a point providing a focal length appropriate to the selected magnification ratio, whereby the optical distance in the folded path extending between the document and the fixed reflex mirror remains constant regardless of changes in magnification ratio, and to impart an angle to said image mirror at said point to cause the image cast thereby onto said photoreceptor surface to be along a path normal to said surface, whereas the optical distance in the folded path between the fixed reflex mirror and the photoreceptor surface changes with changes in magnification ratio;

(G) retractable means to cover said projection lens with at least one auxiliary lens to change the focal length of the optics without displacing the projection lens; and (H) an adjustable synchronizing transmission coupling said drum to said scanning assembly to change the scanning velocity of the assembly relative to the peripheral velocity of the drum in accordance with the selected magnification ratio.

2. A machine as set forth in claim 1, having two auxiliary lenses mounted on a slide plate provided with a central opening to directly expose said projection lens when the opening is in registration therewith, whereby said projection lens may be covered by either of said auxiliary lenses by shifting said plate relative thereto.

3. A machine as set forth in claim 1, wherein said means to shift said image mirror includes a latching plate having notches therein engageable by a detent, said image mirror being secured to said plate whereby the position of said image mirror relative to said drum may be changed.

4. A machine as set forth in claim 3, further including means to impart an angle to said image mirror at each of said detent positions whereby the image cast thereby onto the photoreceptor surface of said drum is along a path normal to said surface.

5. A machine as set forth in claim 1, wherein said transmission includes means providing an output velocity whose rate is adjustable in steps with respect to the peripheral velocity of the drum.

6. A machine as set forth in claim 5, wherein said drum is mounted for rotation on a shaft that is parallel to an auxiliary shaft, the drum shaft and the auxiliary shaft being operatively intercoupled to rotate at the same speed, a hollow shaft coaxially disposed on said drum shaft and having a main wheel mounted thereon whose diameter is the same as the diameter of the drum, said hollow shaft being selectively clutchable to said drum shaft, a first set of sprocket wheels interlinked by a sprocket chain, one wheel in the first set being selectively clutchable to the auxiliary shaft and the other being mounted on the hollow shaft, and a second set of sprocket wheels interlinked by a sprocket chain, one wheel in the second set being selectively clutchable to the auxiliary shaft and the other being mounted on the hollow shaft, whereby by selectively actuating the clutching means, the speed of the main wheel may be changed.

7. A machine as set forth in claim 6 wherein said clutching means are constituted by electromagnetic clutches.

8. A machine as set forth in claim 6, wherein said main wheel is operatively linked to said scanning assembly and said relay mirror by a cable one end section of which is coupled to the object mirror and the other end section to said relay mirror.

9. A machine as set forth in claim 8 wherein said relay mirror is coupled to said cable by a double pulley to cause said mirror to move at one half the velocity of the assembly.

* * * * *